United States Patent [19]

Price

[11] Patent Number: 4,730,818
[45] Date of Patent: Mar. 15, 1988

[54] HOLDING DEVICE

[76] Inventor: Douglas A. Price, 25 Bonacres Avenue, West Hill, Canada

[21] Appl. No.: 11,325

[22] Filed: Feb. 5, 1987

[51] Int. Cl.$^4$ .............................................. B23Q 1/04
[52] U.S. Cl. ...................................................... 269/75
[58] Field of Search ..................... 269/75, 254 CS, 97, 269/98; 248/181, 187, 174

[56] References Cited

U.S. PATENT DOCUMENTS

| 1,280,013 | 9/1918 | Goddard | 248/181 |
| 2,700,523 | 1/1955 | Pollard | 248/181 |
| 3,815,892 | 6/1974 | Tulk | 269/75 |

FOREIGN PATENT DOCUMENTS 762756 12/1956 United Kingdom ................. 269/75

Primary Examiner—Robert C. Watson
Attorney, Agent, or Firm—George A. Rolston

[57] ABSTRACT

A holding device for holding a workpiece in an adjustable position while one or more operations are carried out thereon comprises a base having an annular flange which is received in arcuate recesses provided for such purpose in a pair of mutually spaced and mutually opposed support arms. At their opposite ends, such support arms are provided with opposed concave recesses receiving a generally spherical member carrying a workpiece attachment plate on which a workpiece can be supported. A shaft extends through the support arms intermediate their ends and spring means associated with that shaft bias the support arms toward each other to retain the annular flange within the arcuate recesses and the generally spherical member within the concave recesses. A toggle action clamping member at one end of the shaft can be moved between a released position in which the spherical member can rotate within the concave recesses and the support arms are free for conjoint rotation about the annular flange, and a clamped position in which all such movement of the component parts is prevented.

3 Claims, 5 Drawing Figures

HOLDING DEVICE

FIELD OF THE INVENTION

The invention relates to a holding device for holding a workpiece and is particularly intended for use by hobbyists, tool makers and the like.

BACKGROUND OF THE INVENTION

Various holding devices or clamps have heretofore been suggested for use in holding a workpiece while an operation of one kind or another is carried out thereon.

While the devices heretofore proposed for this purpose have been generally effective, they have in practice presented certain disadvantages and drawbacks.

For example, some of the known devices have been quite complex in their construction and, therefore, have been relatively expensive to manufacture. Others of the known devices have permitted only a limited adjustment of the position of a workpiece supported thereby.

It is accordingly a principal object of this invention to provide a holding device for the aforesaid purpose and which holding device is particularly effective for securely holding a workpiece supported thereby in a desired working position.

Yet another object of this invention is to provide a holding device which is simple in its construction and consequently relatively inexpensive to manufacture.

Another object of this invention is to provide a holding device which is operative to permit a workpiece to be positioned in many different angular orientations.

A further object of this invention is to provide a holding device on which a workpiece can be supported by the ball of a ball-and-socket type joint to permit movement in a first plane through an angle of 360 degrees, movement in a second plane of at least 180 degrees and lesser movement in a third plane and in which such ball-and-socket type joint is itself supported on a turntable type structure also allowing movement of the workpiece in such first plane through a full 360 degrees.

Other objects of the invention and the advantages presented thereby will become apparent as the description herein proceeds.

SUMMARY OF THE INVENTION

A holding device in accordance with this invention and adapted to hold a workpiece and to permit such a workpiece to be disposed in a plurality of angular orientations can broadly be defined as comprising:

a base member adapted to be secured to a supporting surface;

a fixed boss having a longitudinal axis and projecting from the base member;

first and second mutually spaced and mutually opposed support arms mounted on the base member for conjoint rotation of 360 degrees around the boss and about the longitudinal axis thereof, generally opposed and concave recesses being formed in the first and second support arms at positions located outwardly therealong relative to the boss;

a generally spherical movable member disposed between the support arms and partly received within the concave recesses for rotational movement therein in a first plane of 360 degrees about longitudinal axis, rotational movement of at least 180 degrees in a second plane and lesser rotational movement in a third plane;

biassing means interconnecting the support arms and urging those arms toward each other and into gripping engagement with both the movable member and the boss to hinder both such rotational movement of the movable member between the support arms and such conjoint rotation of the support arms about such boss as well as to retain the movable member within the concave recesses;

clamping means interconnecting the support arms and movable between a released position and a clamping position in which such clamping means is operative to maintain the support arms in clamping engagement both with the movable member and with the boss so then to prevent both such rotational movement of the movable member between the support arms and such conjoint rotation of the support arms about the boss; and a workpiece-attachment member secured to the movable member and adapted to have a workpiece attached thereto.

In accordance with a preferred feature of this invention, the support arms of such a holding device are usefully rotatably mounted on the base member by means of an annular flange provided on the boss thereon and received within opposed arcuate recesses formed in such support arms. The biassing means is then operative to maintain such annular flange within those arcuate recesses even when the clamping means is in its released position.

In accordance with a particularly useful feature of this invention, such an annular flange is usefully formed with an obliquely disposed surface engaging corresponding oblique surfaces defining the arcuate recesses in the support arms so that, when the clamping means is moved into its clamping position, the lower ends of those support arms engage the top surface of the base member so as to provide an even more positive immobilisation of the various component parts.

The clamping means provided in a holding device in accordance with this invention usefully comprises a shaft extending freely through the support arms of the device at a location between the arcuate recesses and the concave recesses therein so as to project beyond outer surfaces of those support arms. Stop means on one end of such shaft engage the outer surface of the first support arm and movable toggle means on a second end of such shaft engage the outer surface of the second support arm and is movable between the released and clamping positions.

The biassing means provided in a holding device in accordance with this invention usefully comprises a helical compression spring surrounding such a shaft and disposed so as to act between the toggle means and the second support arm so as to urge second support arm toward the first support arm and to maintain those support arms in gripping engagement with both the annular flange of the boss and the movable member.

In accordance with another preferred feature of this invention, such a biassing means usefully additionally comprises a sleeve threaded into an opening in the second support arm with the shaft extending freely through that sleeve, and an annular flange means on such shaft outwardly of the outer surface of the second support arm, with the compression spring being disposed about the shaft to act on both the annular flange means of the shaft and an outer end of such sleeve thereby to urge such support arms toward each other with a force which can be adjusted by axial movement of such sleeve relative to the second support arm on rotation of the sleeve relative thereto.

In accordance with yet another preferred feature of this invention, a holding device in accordance therewith is usefully provided with a number of workpiece-attachment members on which different workpieces can be mounted and each of which can be releasably secured to the movable member when it is desired to carry out working operations on a selected workpiece.

Other variations and modifications within the scope of this invention will become apparent as the description herein proceeds.

BRIEF DESCRIPTION OF THE DRAWINGS

The invention will now be described merely by way of illustration with reference to the accompanying drawings in which.

DESCRIPTION OF THE PREFERRED EMBODIMENTS

Figure 1:
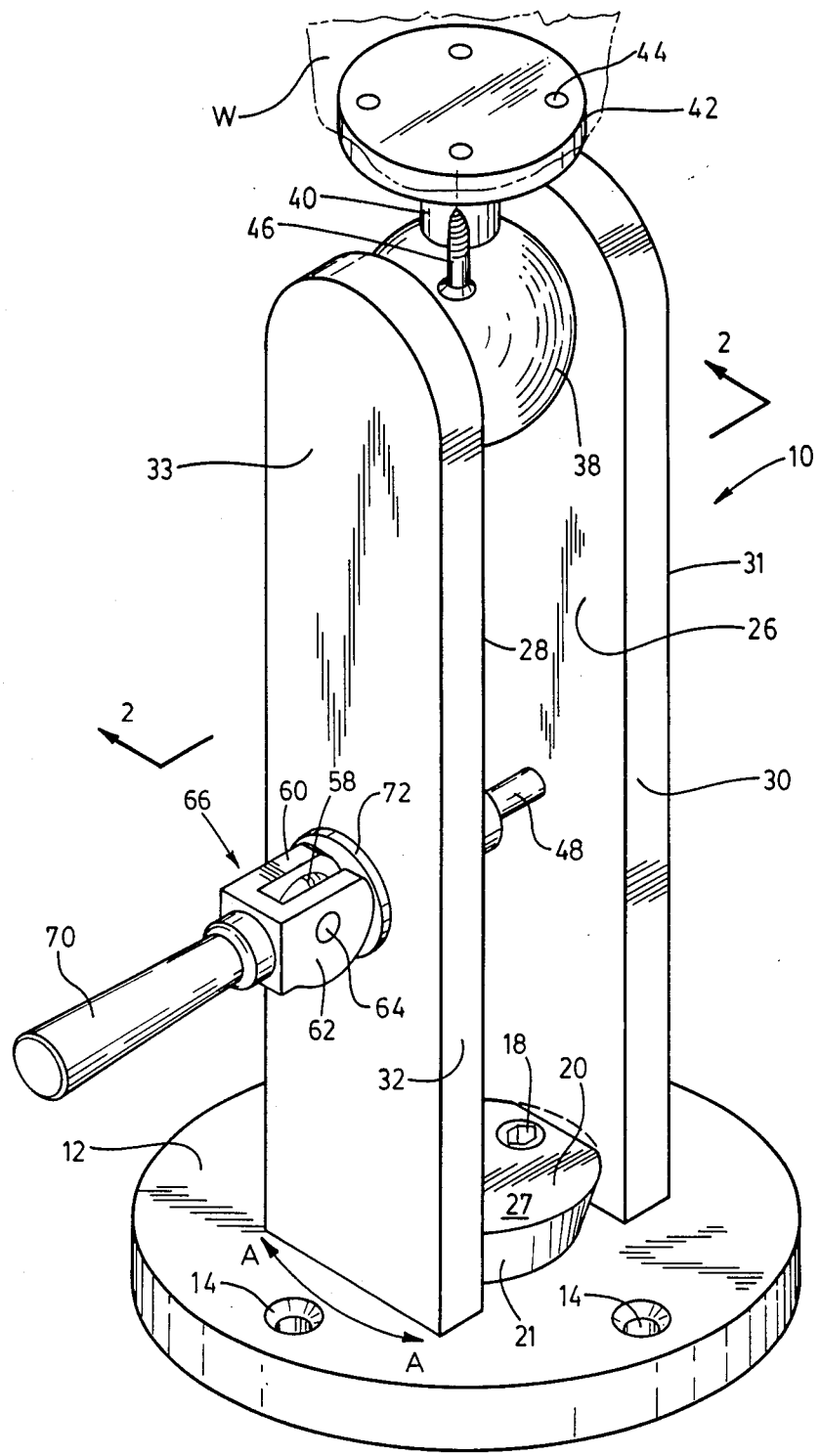
FIG. 1 is a perspective view of one embodiment of a holding device in accordance with the invention and showing a toggle mechanism of such a device in its released position.
Figure 2:
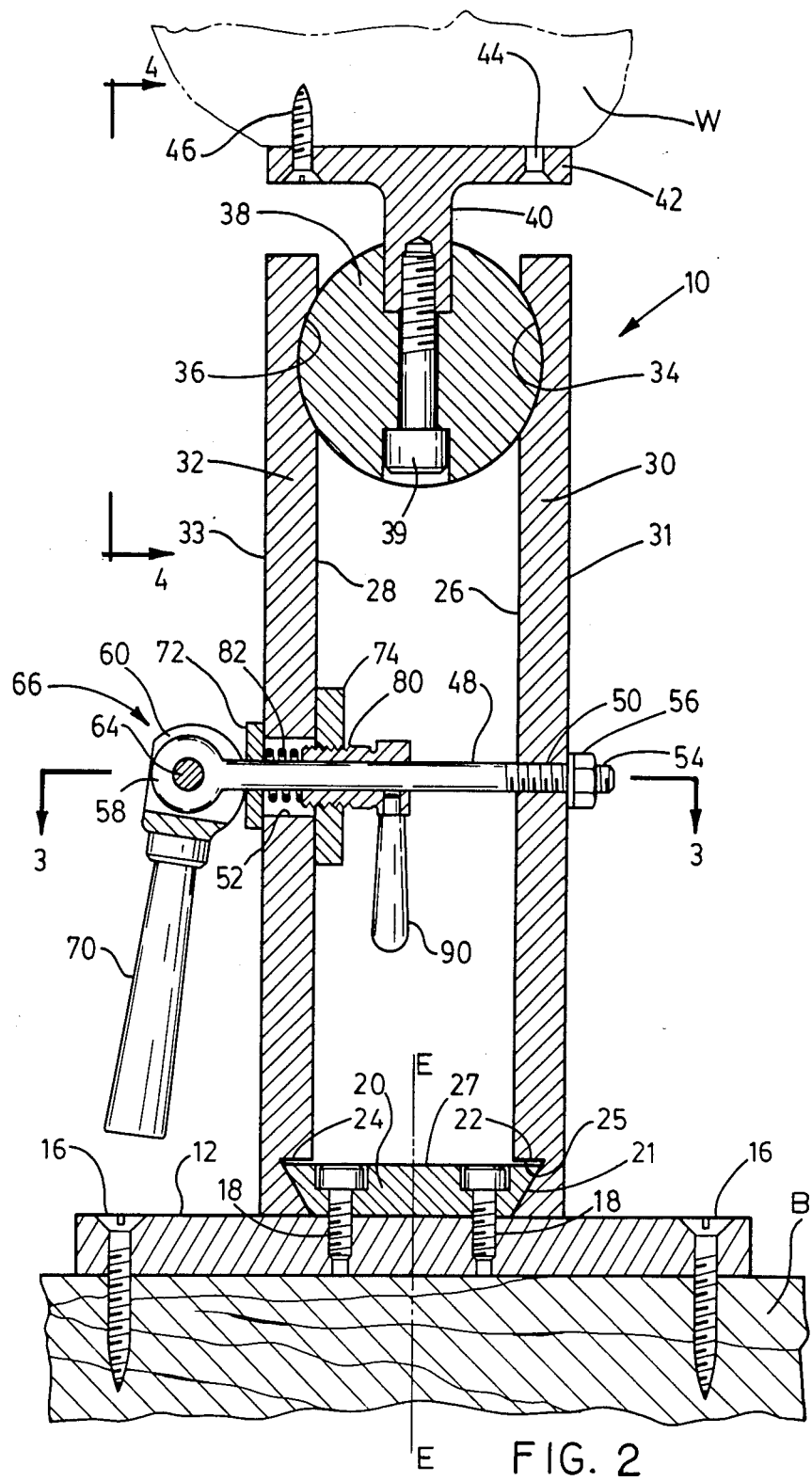
FIG. 2 is a vertical sectional view through the holding device of FIG. 1 when taken as indicated by the arrows 2—2 of that figure but showing the toggle mechanism in its clamped position.

The holding device generally indicated at 10 in FIGS. 1 and 2 of the accompanying drawings is illustrated as being mounted on a work bench B (FIG. 2) and is intended to permit various operations to be carried out on a workpiece generally indicated in phantom outline at W in FIGS. 1 and 2.

The holding device 10 comprises a base member or plate 12 which is shown as being provided with countersunk holes 14 through which screws 16 (FIG. 2) can be used for securing the device 10 in position on the workbench B. It will, of course, be understood that the invention is not restricted to the provision of such screw holes 14 and that the device 10 can be secured to the bench B or to any other desired surface or body, whether horizontally disposed or not, in other ways, for example, by the use of a suitable clamp. It is to be noted that the base plate 12 is not shown in FIG. 3 of the drawings.

As will be seen by reference to FIGS. 1 and 2, there is secured on the base plate 12 by machine screews 18 an upstanding circular plate 20 which is undercut so as effectively to provide an annular flange 21 which is received within opposed arcuate recesses 22 and 24 formed in inner surfaces 26 and 28 respectively of first and second upstanding and opposed support arms 30 and 32 respectively to permit conjoint rotation of those arms 30 and 32 through 360 degrees as indicated by the doubleheaded arrow A (FIG. 1) about a vertical axis E—E (FIG. 2) of the plate 20.

The support arms 30 and 32 have outer surfaces 31 and 33 respectively and, near their upper ends, are formed with opposed concave recesses 34 and 36 respectively and receive therebetween and partly within such recesses 34 and 36 a generally spherical member or ball 38 to which there is secured by machine screw 39 a stem 40 which is integrally formed with an attachment member or plate 42 on which a workpiece W may be suitably secured to permit operations, such as carving, drilling, filing, polishing, etc., to be carried out on such a workpiece. The plate 42 is shown in the drawings as being provided with screw holes 44 for receiving screws 46 for such attachment of the workpiece W to the plate 42. It will, however, be understood that a workpiece W may be secured to the plate 42 in other ways.

Figures 3, 4:
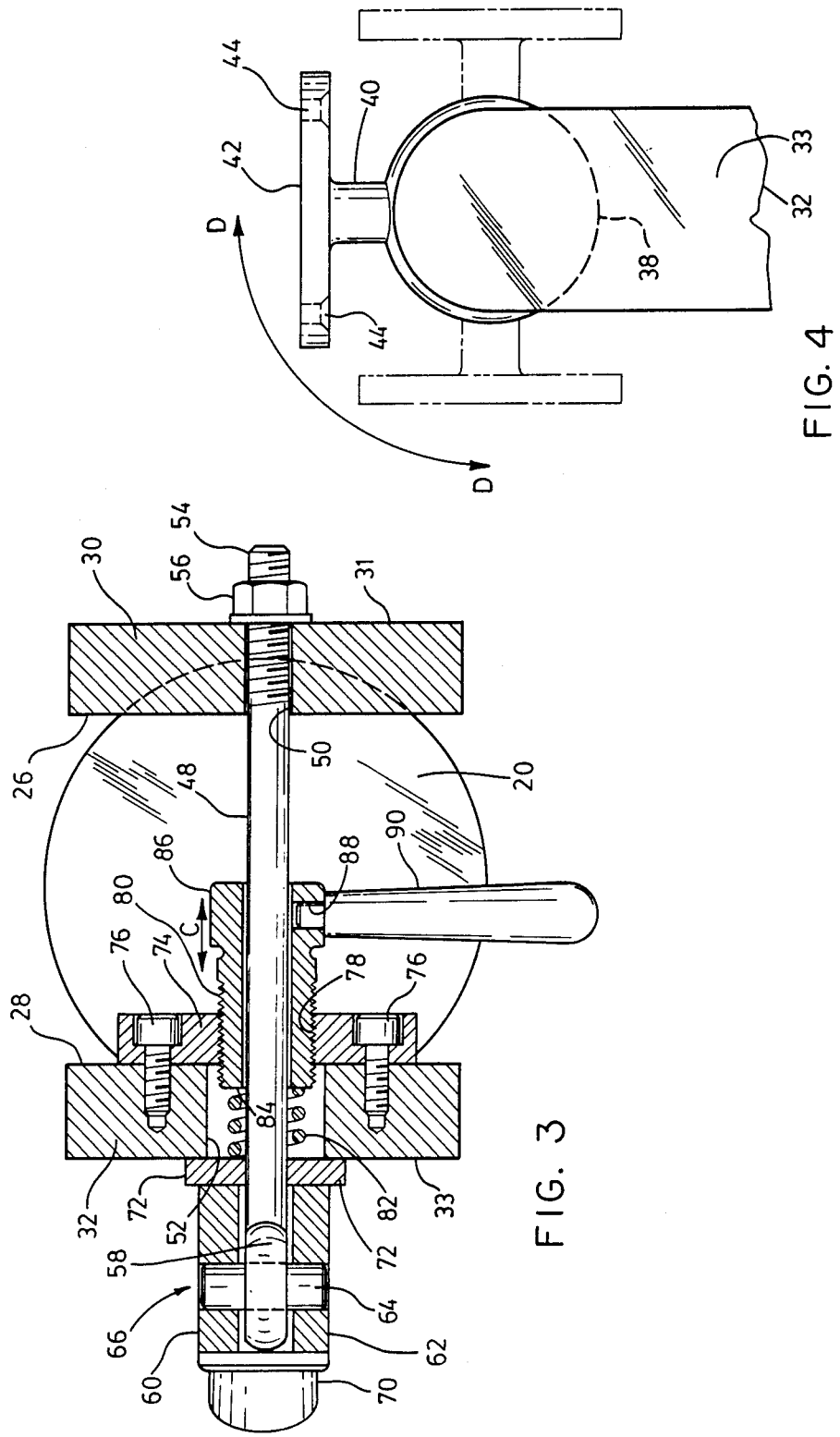
FIG. 3 is a horizontal sectional view when taken as indicated by the arrows 3—3 of FIG. 2, with a base plate which forms part of the device omitted for the sake of clarity.
FIG. 4 is a fragmentary side elevation when taken as indicated by the arrows 4—4 of FIG. 2.

As will best be understood by reference to FIG. 4 of the drawings, this ball-and-socket type arrangement permits movement of the plate 42 through 360 degrees in a first plane about the aforementioned axis E—E, movement through at least 180 degrees as indicated by the double-headed arrow D in second plane between the various positions shown as well as allowiing partial rotation in a third plane. To facilitate such 180 degree rotation, the upper ends of the support arms 30 and 32 are curved and the stem 40 is sufficiently long to ensure that the plate 42 clears those arms 30 and 32 during such rotation. It will be seen that, with the dimensions shown in FIG. 4, rotation in such second plane of considerably more than 180 degrees is in fact possible.

At a location between the arcuate recesses 22 and 24, on one hand, and the concave recesses 34 and 36, on the other hand, a shaft 48 extends freely through aligned bores 50 and 52 in the first and second support arms 30 and 32 respectively. One end of the shaft 48 is threaded as indicated at 54 to receive a nut 56 for abutment against the outer surface 31 of the first support arm 30.

Outwardly of the outer surface 33 of the second support arm 32, the shaft 48 is integrally formed with an extension 58 on which there is pivotally mounted by a pivot pin 64 a toggle mechanism generally indicated at 66 and including arms 60 and 62. The arms 60 and 62 are formed with cam surfaces 68 and a handle 70. A washer 72 is disposed around the shaft 48 between the extension 58 and the outer surface 33 of the second support arm 32 effectively to provide an annular outer flange for engagement by the cam surfaces 68 as will be understood as the description herein proceeds.

A plate 74 is secured by machine screws 76 to the inner surface 28 of the second support arm 32 so that a threaded opening 78 in that plate is coaxially disposed with the bore 52 in the arm 32. It is to be noted that the diameter of the opening 78 is slightly smaller than that of the bore 52. An externally threaded sleeve 80 is screwed into the plate 74 so as to extend into the bore 52. A helical compression spring 82 is disposed about the shaft 48 so as to act between the washer 72 and the outer end 84 of the sleeve 80. Inwardly of the second support arm 32, the sleeve 80 is integrally formed with a head 86 having a radial bore 88 for receiving a handle 90 which can, as desired, be fixed or removable in such bore 88. The handle 90 is used to rotate the head 86 so in turn to cause axial displacement of the sleeve 80 relative to the second support arm 32 as indicated by the double-headed arrow C. It is to be noted that the handle 90 is shown in different angular positions in FIGS. 2 and 3.

It will now be understood that the spring 82 acts as a biassing means between the washer 72 and the plate 74 to urge the second support arm 32 toward the first support arm 30 so as to maintain the annular flange 21 of the base plate 12 within the arcuate recesses 22 and 24 as well as to retain the generally spherical member 38 within the concave recesses 34 and 36.

With the toggle mechanism 66 in the released position as shown in FIG. 1, the generally spherical member 38 is free frictionally to rotate in the concave recesses 34 and 36 in the manner already discussed and the support arms 30 and 32 are free for conjoint rotation about the boss 18 as indicated by the double-headed arrow A so allowing the holding device 10 to be adjusted so that a workpiece such as the workpiece W can be positioned in a large number of different positions. The biasing action of the spring 82 is, however, effective to prevent not only disengagement of the support arms 30 and 32 from the plate 20 and disengagement of the generally spherical member 38 from within the concave recesses 34 and 36 but also to provide some degree of frictional gripping between these various members so as to permit them to be moved into and set in desired positions.

Having so positioned the workpiece W in a desired position, the handle 70 of the toggle mechanism 66 is moved to the clamping position shown in FIG. 2 which causes the support arms 30 and 32 to move closer together and into firm clamping engagement with the generally spherical member 38 and with the annular flange 21 on the base member 12 so as then firmly to hold or secure the workpiece in the desired position while a desired operation or operations are carried out thereon. During such clamping of the arms 30 and 32, their engagement with the undercut flange 21 of the plate 20 forces the lower edges of those arms into engagement with the top surface 27 of the base plate 12 as will best be understood by reference to FIG. 2 so in turn to provide even more positive immobilisation of the arms 30 and 32. To ensure such action, the recesses 22 and 24 are defined by upper surfaces 25 which are slightly spaced apart from the top surface 27 of the plate 20 when the toggle mechanism 66 is in its clamping position.

It will further be understood that, by adjusting the axial position of the sleeve 80 using the handle 90, the gripping pressure on the generally spherical member 38 and on the annular flange 21 can be adjusted. This is valuable in that it allows the position of a workpiece to be carefully adjusted and set before the toggle mechanism 66 is moved into its clamping position. It should also be understood that the sleeve 80 and the spring 82 are dimensioned so that such spring will not be fully compressed even when the toggle mechanism 66 is in its clamping position.

It is also within the scope of this invention alternatively to provide, instead of the sleeve 80 and spring 82, a biassing means in the form of a spring or spring washer between the arm 30 and the nut 56.

Figure 5:
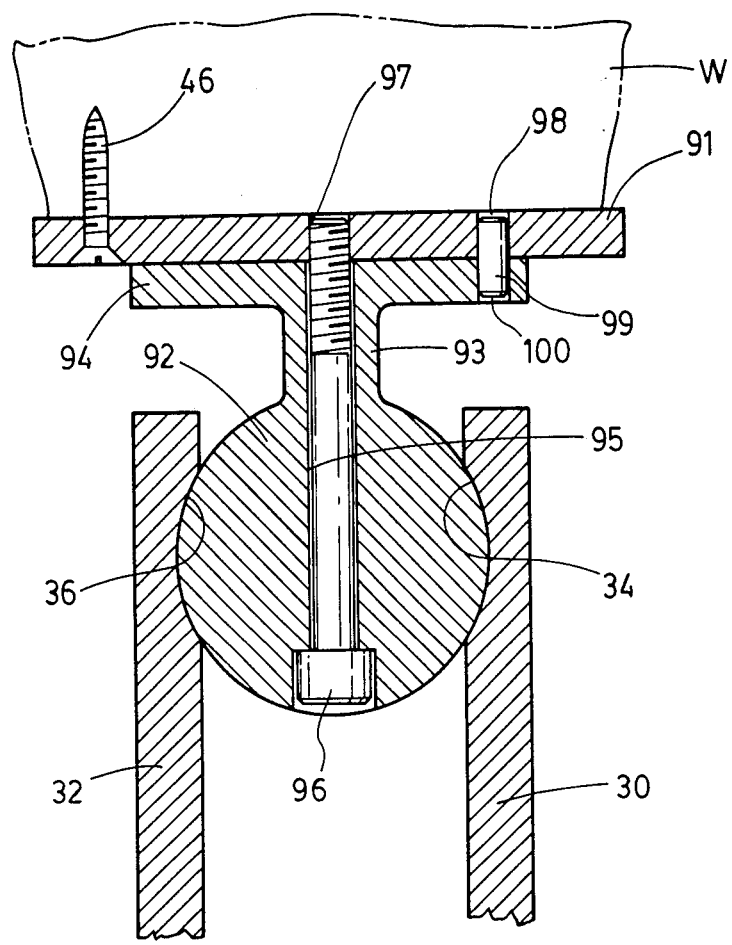
FIG. 5 is a fragmentary side elevation of an alternative embodiment of a holding device in accordance with this invention.

Reference will next be made to FIG. 5 of the accompanying drawings in which there is shown an alternative arrangement in which the holding device is provided with several attachment members or plates 91 on which different workpieces W may be secured by screws 46 (only one of which is shown) and which plates 91 can be releasably secured to a ball 92 of the holding device in a manner yet to be described. In this way, a workpiece can remain mounted on such a plate 91 until such time as all operations on that workpiece have been completed while, at the same time, permitting the holding device to be used with other workpieces mounted on other ones of the plates 91. This is particularly important when workpieces are of wood or other friable material where repeated removal and insertion of the mounting screws 46 might enlarge the screw holes in such a workpiece and eventually lead to a situation where it might be extremely difficult to mount the workpiece.

To permit such releasable mounting of a given one of the mounting plates 91 on the device, the ball 92 is formed with a stem 93 and a support plate 94 which are integrally formed or suitably secured together. An axial bore 95 extends through the ball 92, stem 93 and support plate 94 to receive a machine screw 96 which screws into a threaded central bore 97 provided in each of the mounting plates 91. To eliminate any risk of movement of such a mounting plate 91 on the support plate 94, each of the mounting plates 91 is formed with a nonaxial bore 98 for receiving a dowel pin 99 upstanding from the support plate 94. Such a dowel pin 99 is shown in FIG. 5 as being secured to the support plate 94 by a press fit in a bore 100 therein.

The foregoing is a description of a preferred embodiment of the invention which is given here by way of example only. The invention is not to be taken as limited to any of the specific features as described but comprehends all such variations thereof as come within the scope of the appended claims.

What is claimed is:

1. A holding device adapted to hold a workpiece and to permit such a workpiece to be disposed in a plurality of angular orientations and which holding device comprises:

a base member adapted to be secured to a supporting surface;

a fixed boss having a longitudinal axis and projecting from said base member and an annular flange provided by said boss having an inwardly and downwardly sloping surface;

first and second mutually spaced and mutually opposed support arms mounted on said base member for conjoint rotation of 360 degrees around said boss and about said longitudinal axis thereof, generally opposed and concave rcesses being formed in said first and second support arms at positions located outwardly therealong relative to said boss; and opposed arcuate recesses formed in said support arms in proximity to lower ends thereof and receiving said annular flange, said arcuate recesses being formed with inwardly and downwardly sloping surfaces engaging said inwardly and downwardly sloping surface of said annular flange;

a generally spherical movable member disposed between said support arms and partly received within said concave recesses for rotational movement therein in a first plane of 360 degrees about said longitudinal axis, movement of at least 180 degrees in a second plane and lesser rotational movement in a third plane;

biassing means interconnecting said support arms and urging said arms toward each other and into gripping engagement with both said movable member and said boss to hinder both said rotational movement of said movable member between said support arms and said conjoint rotation of said support arms about said boss as well as to retain said movable member within said concave recesses;

clamping means interconnecting said support arms which in turn comprises a shaft extending freely through said support arms at a location between said arcuate recesses and said concave recesses therein so as to project beyond outer surfaces of said support arms, stop means on one end of said shaft engaging said outer surface of said first support arm and movable toggle means on a second end of said shaft engaging said outer surface of said second support arm, and movable between a released position and a clamping position in which said clamping means is operative to maintain said support arms in clamping engagement both with said movable member and with said boss so then to prevent both said rotational movement of said movable member between said support arms and said conjoint rotation of said support arms about said boss and said inwardly and downwardly sloping surfaces of said annular flange and of said arcuate recesses co-operating so as to urge said support arms into engagement with said base; and a workpiece-attachment member secured to said movable member and adapted to have a workpiece attached thereto.

2. A holding device which comprises:

a base member having upper and lower surfaces and adapted to be secured in position on a supporting surface;

a fixed boss having a longitudinal axis and extending upwardly from said upper surface of said base member;

an outwardly directed annular flange on said boss upwardly of said upper surface of said base member and formed with an inwardly and downwardly sloping surface;

mutually spaced apart and mutually opposed first and second support arms having opposed arcuate recesses formed therein in proximity to lower ends thereof and receiving said annular flange of said boss for conjoint rotation of said support arms through 360 degrees around said boss and about said longitudinal axis thereof, said arcuate recesses being formed with inwardly and downwardly sloping surfaces engaging said inwardly and downwardly sloping surface of said annular flange and said support arms also being formed with opposed concave recesses in proximity to upper ends thereof;

a generally spherical movable member disposed between said support arms and partly received within said concave recesses therein for rotational movement therein;

a shaft slidingly extending through aligned bores in said first and second support arms at a location between said arcuate recesses and said concave recesses therein;

a nut threaded onto an end of said shaft outwardly of an outer surface of said first support arm for engagement thereby;

an extension of said shaft outwardly of said second support arm;

a cam-shaped toggle member pivotally mounted in said extension of said shaft, engaging said second support arm and movable between a released position in which said generally spherical member is free to rotate within said concave recesses and said support arms are free to rotate conjointly around said boss and a clamped position in which such movement of said generally spherical member and such conjoint rotation of said support arms are prevented and with lower ends of said support arms then engaging said base member;

a sleeve in an opening in said second support arm and having said shaft extending freely therethrough;

a compression spring disposed around said shaft and engaging said sleeve thereby to act to urge said second support arm toward said first support arm to cause said support arms to engage both said generally spherical member and said annular flange of said boss even when said toggle member is in said released position thereof;

a stem on said generally spherical member and projecting outwardly therefrom between said support arms; and, a workpiece-attachment member on said stem for conjoint movement with said generally spherical member 3. A holding device as claimed in claim 2 and in which said workpiece-attachment member is releasably secured to a support plate in turn secured to said stem of said generally spherical member for conjoint movement therewith.

* * * * *